(12) United States Patent
Stahl

(10) Patent No.: US 6,574,640 B1
(45) Date of Patent: Jun. 3, 2003

(54) SYSTEM AND METHOD FOR ARCHIVING AND SUPPLYING DOCUMENTS USING A CENTRAL ARCHIVE SYSTEM

(75) Inventor: Stefan Stahl, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 09/638,780

(22) Filed: Aug. 15, 2000

(30) Foreign Application Priority Data

Aug. 17, 1999 (DE) .......................................... 99116087

(51) Int. Cl.$^7$ .............................................. G06F 17/30
(52) U.S. Cl. ........................ 707/204; 707/200; 707/202; 707/205
(58) Field of Search ..................... 707/1–10, 100–104.1, 707/200–205

(56) References Cited

U.S. PATENT DOCUMENTS

| | | | | |
|---|---|---|---|---|
| 3,854,126 A | * | 12/1974 | Gray et al. ..................... | 711/2 |
| 5,530,899 A | * | 6/1996 | MacDonald .................. | 710/17 |
| 5,751,997 A | * | 5/1998 | Kullick et al. ............... | 709/215 |
| 5,778,395 A | * | 7/1998 | Whiting et al. ................ | 707/10 |
| 5,813,017 A | * | 9/1998 | Morris ........................ | 707/203 |
| 6,321,254 B1 | * | 11/2001 | Meyer et al. ................ | 709/213 |
| 6,330,589 B1 | * | 12/2001 | Kennedy .................. | 707/104.1 |

* cited by examiner

Primary Examiner—Greta Robinson
Assistant Examiner—Linh Black
(74) Attorney, Agent, or Firm—Louis J. Percello, Esq.

(57) ABSTRACT

The present invention relates to flexible facilities for supplying documents where the index to the documents is stored in a central archive but the documents themselves are stored in an external archiving system. The solution according to the invention is based on management of the addresses in the external archiving systems which is undertaken at the central archive. The approach adopted supports the specifying of any desired number of backup servers and, by allowing the configurable supply either of the address relation itself and/or of server address information attached to the list of search results, it provides a facility which supports the full range of document supply capabilities available when a central archive system is being used.

18 Claims, 4 Drawing Sheets ic # SYSTEM AND METHOD FOR ARCHIVING AND SUPPLYING DOCUMENTS USING A CENTRAL ARCHIVE SYSTEM

FIELD OF THE INVENTION

The present invention relates to a system and a method for archiving and supplying documents using a central archive system.

BACKGROUND OF THE INVENTION

Conventional archive systems are generally closed systems. Closed systems of this kind have interfaces for importing documents and searching for them. Links with other archive systems are confined to the intake of documents plus index data. As a result, the administrative and configuring tools available within the archive systems are purely system-related.

Where there is only one archive system being used within a company, the facilities offered by the system are generally adequate. The administrators have only one system to look after and the users are familiar with the end-user interface. In practice, however, it has been found that in companies of any size there is generally more than one archiving solution in use.

Where there is more than one archiving solution in use, possibly on different platforms, it becomes increasingly difficult for the company to administer all the systems, to obtain an overview of the document holdings which exist within the company, and to provide end-users with easy access to these documents. The last point is a particular problem because, where there are several systems, the end-user has to know how to operate all of them.

A natural development of individual archive systems is a central archive system that can incorporate other archive systems irrespective of their platforms and producers. The advantage of a central archive system is that, because it will fully incorporate a large number of individual archive systems, it gives a complete picture of the document holdings which exist within a company. A system which can be cited as an example of a central archive system which provides this facility for incorporation is the Enterprise Document Management System (EDMS), commercially available from IBM Corporation. The essential features of a central archive system that can incorporate different individual archive systems are:

1. A central index to many different document management systems and decentralized servers, irrespective of the platforms they use.
2. Ability to process large volumes of data.
3. Harmonized view of all documents irrespective of where they are stored.
4. Total flexibility of indexing and thus total flexibility for search enquiries and document requests as well.

Where a central archive is going to be used, it has to be embedded into the existing infrastructure of a company. This is particularly true of end-user applications (end-user interfaces), which can differ widely from company to company or even from division to division within a company. Rigidly fixed search facilities in the form of hard-wired search applications and search windows which exist in some conventional archiving systems do not simply restrict the widespread adoption of central archives but in fact virtually rule out their use in practice. To provide the maximum possible flexibility, it would be necessary to have interfaces which, as far as their functionality is concerned, provide every possible facility for search and document requesting applications which matched to the company's needs. Since central archives are usually only employed in companies where there are a very large number of people using them, an interface of this kind needs to be a server component which accepts search/document requests from users as clients and passes them on to the central archive for processing, as shown in FIG. 1.

An interface of this kind, which will be referred to herein as a front-end server, should also be available for as many platforms as possible. Where there is a front-end server of this kind (as there is in EDMS), then it can be used by the company to handle accesses to the central archive from company-specific user interfaces.

FIG. 2 shows a central archive to which external archiving systems are connected. The index of the documents present in the external archiving systems is stored in the central archive. Special access programs tailored to the external archiving systems enable the document requests made to be handled by the central archive.

A company-specific search application adapted to the front-end server is used by an end-user to make searches in the central archive. The search request is accepted by the front-end server and passed on to the central archive for processing. The central archive makes the search and passes the result back to the front-end server, from where it can be collected by the company-specific application. The end-user selects the documents he needs to look at and asks the central archive for them. The latter finds that the relevant documents are in an external archiving system and in turn asks the external system for them. Once they reach the central archive, the central archive passes the documents on to the front-end server, from where they can be collected by the company-specific application.

Document-request handling of this kind can be seen as a basic function of central archives. The disadvantages it has are that:

a) By reference to the data held in store, the central archive must recognize that the document requests it has are for documents whose index is stored in the central archive but which are themselves stored in an external archiving system.
b) The central archive must contain data on where a document request has to be passed on to or which triggers a request to the external archiving system in question.
c) The central archive must accept documents supplied by external archiving systems and pass them on to the front-end server.
d) For each external archiving system, the central archive must have a program for handling document requests or a program of this kind must be implemented to connect in the external systems.

SUMMARY OF THE INVENTION

Generally, a method and apparatus are disclosed for archiving and supplying documents using a central archive. If it is assumed that the individual external archiving systems belonging to a company were procured before the central archive system, then for each external archiving system the company will already have a mechanism for directly handling document requests. According to an aspect of the invention, once a list of the results of a search has been supplied, then the central archive can be bypassed and the particular external archiving system involved can be accessed directly.

The object of the present invention is therefore to provide a simplified method and system for supplying documents by using a central archive, which method and system avoids the disadvantages mentioned above.

The present invention relates to flexible facilities for supplying documents where the index to the documents is stored in a central archive but the documents themselves are stored in an external archiving system.

The solution according to the invention is based on management of the addresses in the external archiving systems which is performed at the central archive. The approach adopted supports the specifying of any desired number of backup servers and, by allowing the configurable supply either of the address relation itself and/or of server address information attached to the list of search results, it provides a facility which supports the full range of document supply capabilities available when a central archive is being used.

A more complete understanding of the present invention, as well as further features and advantages of the present invention, will be obtained by reference to the following detailed description and drawings.

BRIEF DESCRIPTION OF THE DRAWINGS

The present invention is described below by reference to a preferred embodiment shown in the drawings, in which.

DETAILED DESCRIPTION OF PREFERRED EMBODIMENTS

Figure 1:
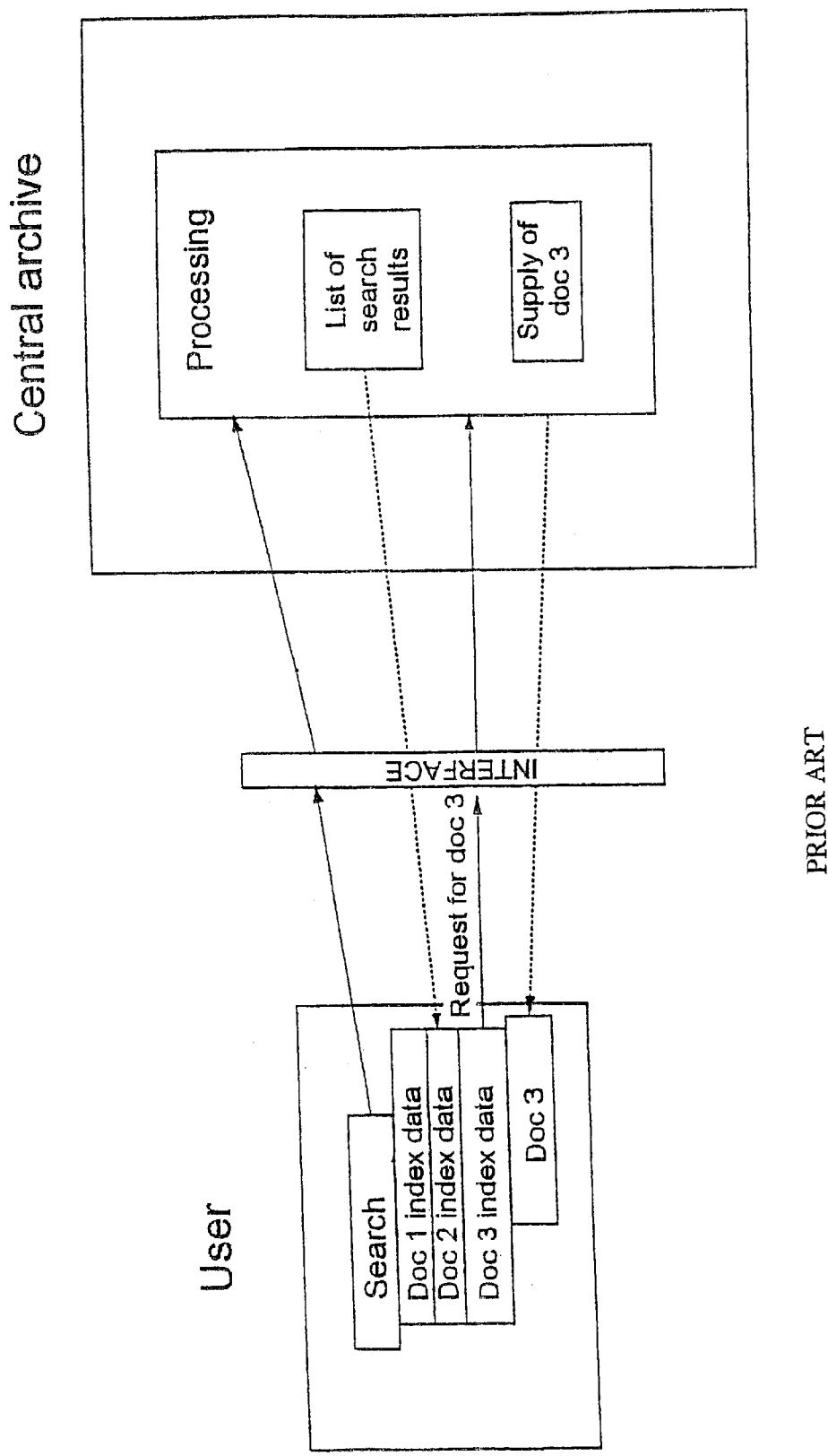
FIG. 1 shows the prior art supply of documents from a central archive system.

FIG. 1 illustrates the existing method of supplying documents via a central archive system. The user makes a search enquiry to the central archive system from his own system. The user system is not connected directly to the central archive but is connected via a server system. Documents can either be stored in the central archive system itself or they may be located on an external archiving system, in which case all that is stored on the central archive system is index information to enable the documents to be accessed. Index information comprises identifiers which help to find a given document. If for example contracts and agreements of all kinds are stored on an external archiving system, then the following identifiers for accessing the contracts and agreements may exist on the central archive system: purchase agreement, car purchase agreement, name of purchaser, make of car, date of purchase agreement, number of purchase agreement and so on. The values making up a particular identifier need not specifically identify a single document, e.g., the identifier "Name" will generally identify a plurality of documents. If the user makes a search request by selecting one or more identifiers, the documents shown in the list of search results will be those which contain these identifiers. In FIG. 1, three documents were found and the user is requesting document 3 from the central archive.

Figure 2:
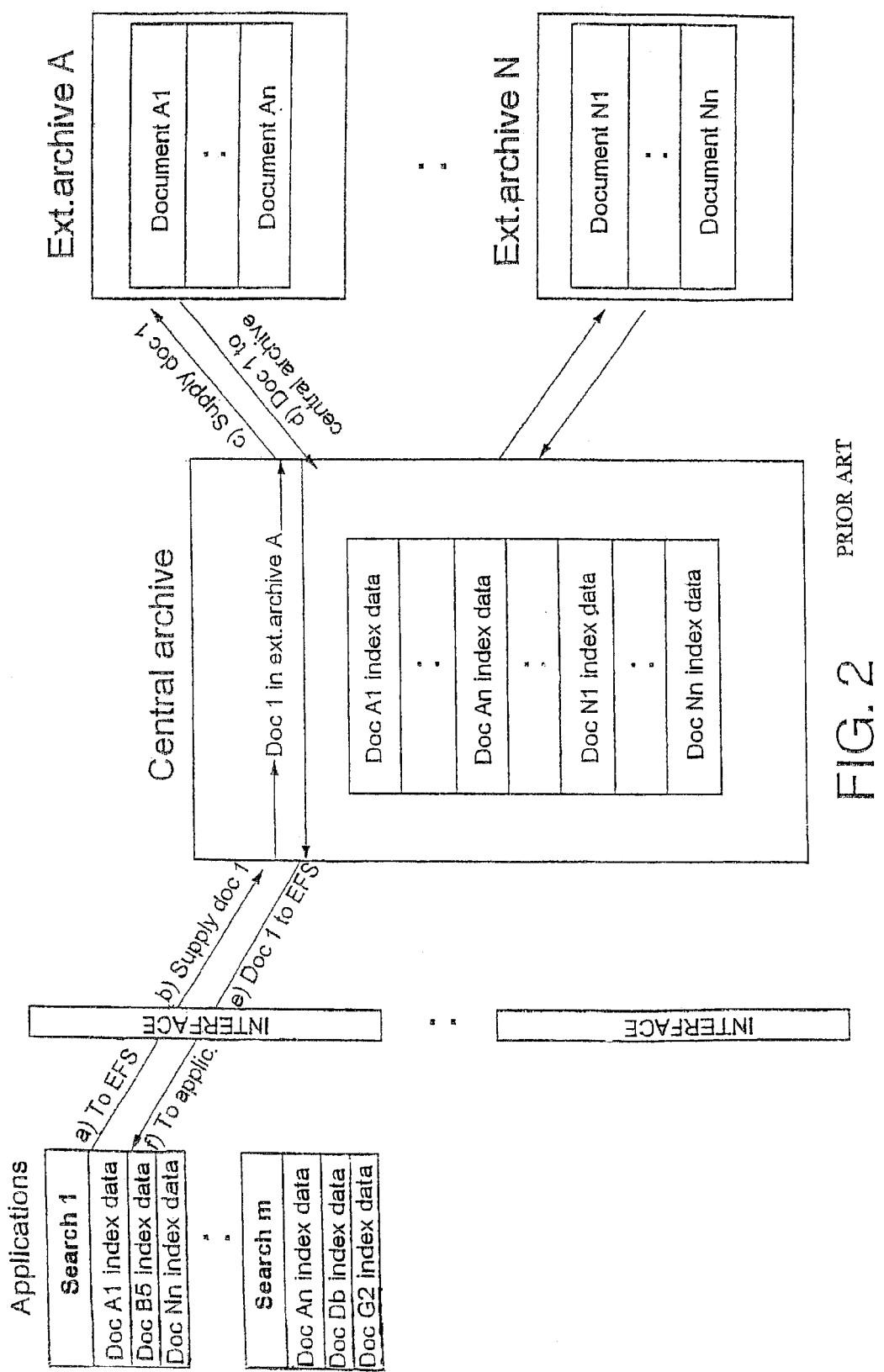
FIG. 2 shows the supply of documents from an external archiving system via the central archive.

FIG. 2 shows the prior art communications architecture between the user, the central archive system and external archiving systems. The central archive system has access to external archiving systems A–N and there are a plurality of applications which communicate with the central archive system. An application sends a search enquiry to the central archive system. The central archive system sends to the application a list of search results comprising the index data for documents A1, B5, Nn. The user sends to the central archive system a request for a selected document to be supplied. The central archive system identifies the server on which document A1 is stored from the address data and sends a request to the server which has been identified (external archiving system A) for document A1 to be supplied. Document A1 is then sent to the application via the central archive system.

Figure 3:
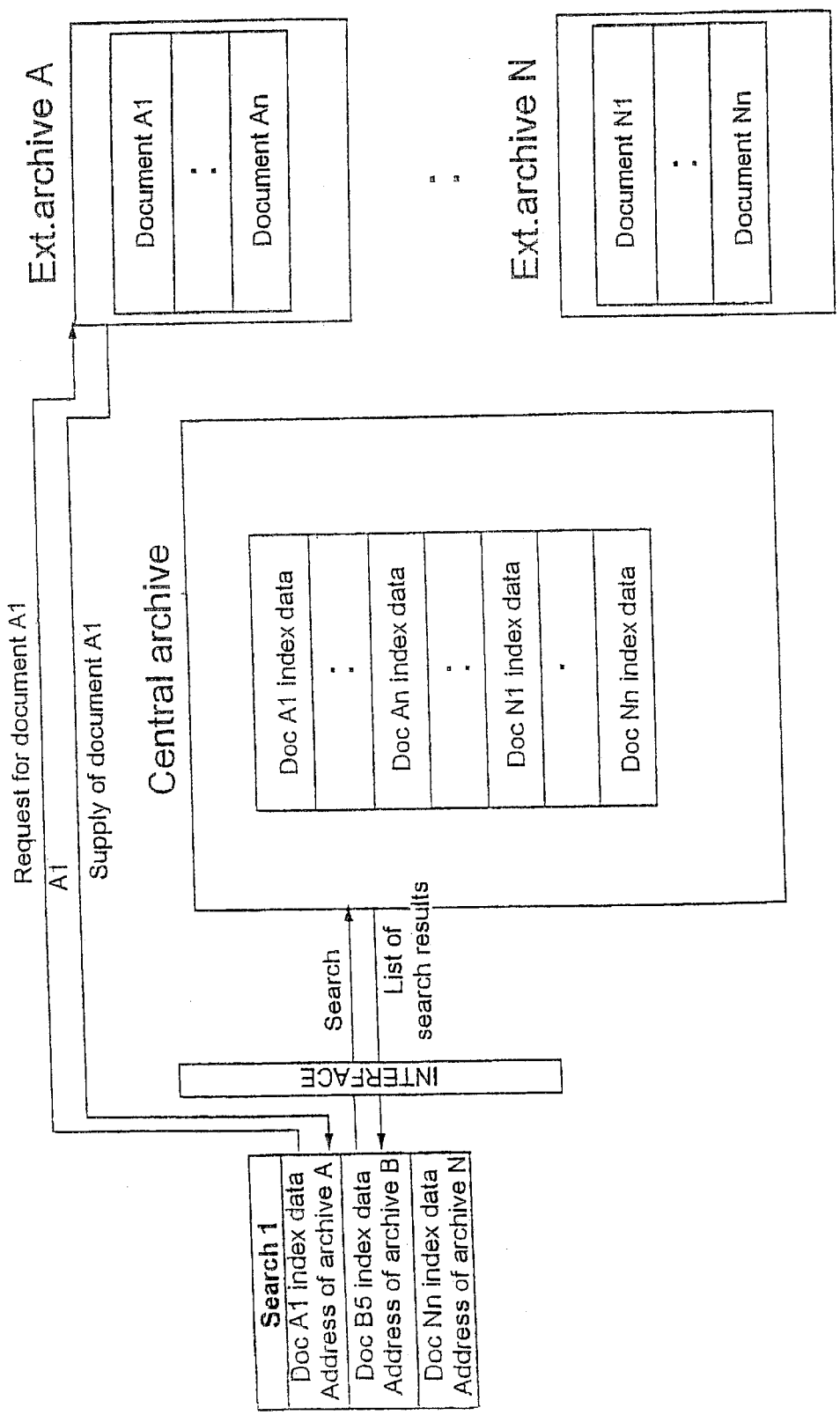
FIG. 3 shows the central archive architecture according to the invention for supplying documents.

FIG. 3 shows the central archive architecture according to the present invention for supplying documents.

The method to which the present invention relates is based on administration and management, supported by the central archive system, of the external archiving systems linked to the central archive system.

At the time of the index import, i.e., when index data is loaded into the central archive system, a logic address in the external archive system in which the particular document is physically stored is at the same time loaded into the index for the document which is stored on the central archive system. These logic addresses are managed as 1–N relations within the central archive system, i.e., one logic address is assigned to a plurality of real addresses, with one element being marked out as CURRENT. A 1–N relation of this kind ensures that a) any desired number of backup servers can be defined for each external archiving system;

b) when an archiving system is moved, the real address can be changed without any problems.

To obtain the maximum possible flexibility for company-specific applications, in the present invention the component of the central archive system which is responsible for supplying lists of search results is designed to be configurable. Possible options are:

1. Supply of the real address plus x backup addresses (when defined) by the central archive system. When lists of search results are supplied, the component responsible for this task converts the logic address into the real address (plus backup addresses) which is current at that time, assigns it to the address meta-information and supplies it to the front-end server (external interface with central archive system). The risk inherent in supplying data of this kind is that of the real address being changed by an administrator shortly after a list of search results is supplied. This is a risk particularly with front-end servers which have a disconnected retrieval function (e.g., mobile users put in document requests on day x but do not retrieve the results until day x+y). The address meta-information has to be read out by the application and a direct connection then made with the external archiving system. The desired document is supplied direct to the user without being diverted through the central archive system.

2. Supply of the logic address as address meta-information for each set of index information for a document. This is shown in more detail in FIG. 4.

Figure 4:
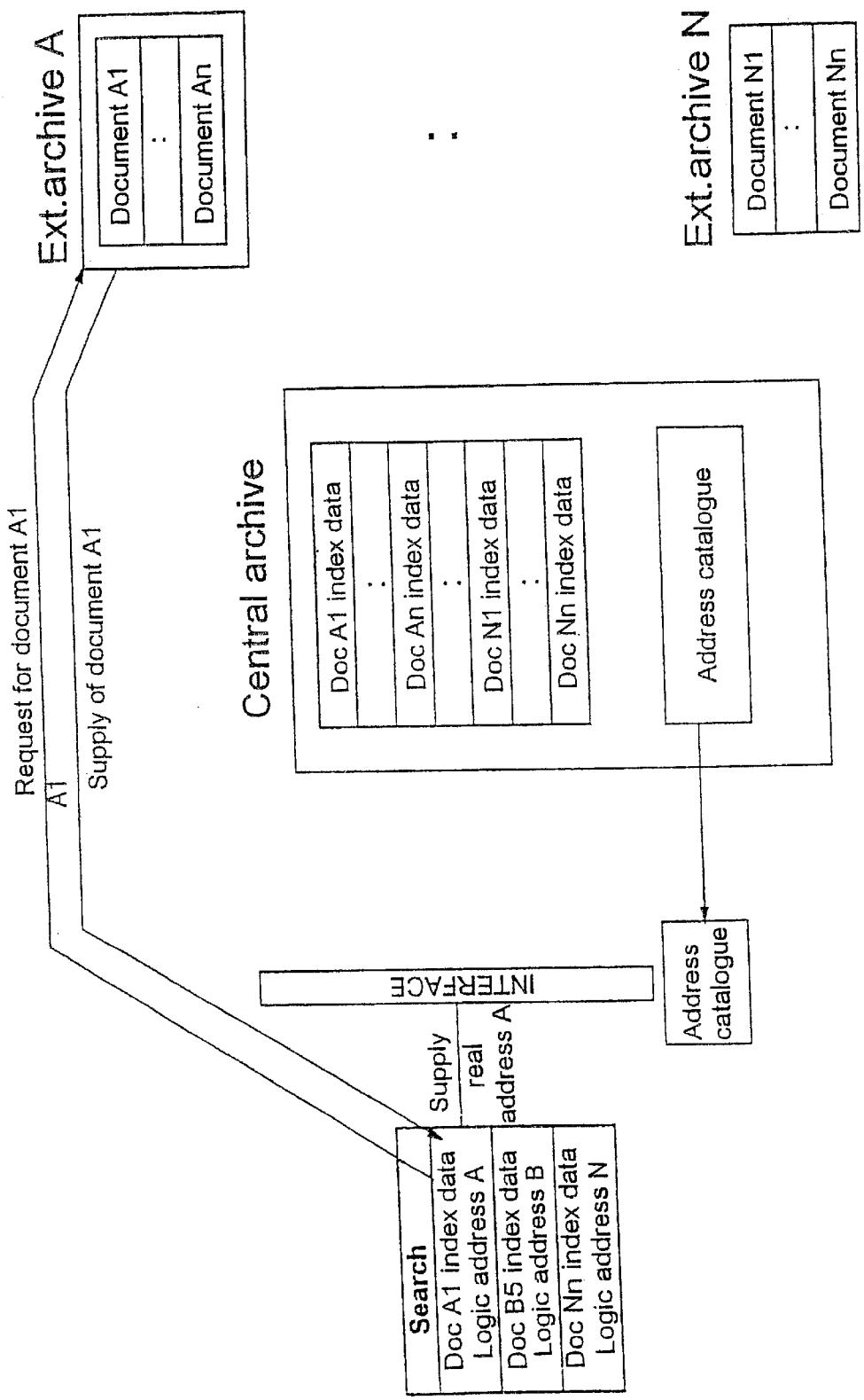
FIG. 4 shows the central archive architecture according to the invention for supplying documents when an address catalogue is used.

FIG. 4 shows a particular embodiment of the present invention. In this case, at the time of the index import, i.e., when index data is loaded into the central archive system, a logic address in the external archive system in which the particular document is physically stored is at the same time loaded into the index for the document which is stored on the central archive system. Also, these logic addresses are managed as 1–N relations within the central archive system, i.e., one logic address is assigned to a plurality of real addresses, with one element being marked out as CURRENT. When a list of search results is supplied, the logic address is supplied along with it as part of the index information on a document. What this implies is that at the time when they are run, company-specific applications must make a conversion from the logic address to the real address. This is done on the basis of an address catalogue. An address catalogue provides at all times an overview of the external archiving systems logged on within a central archive system, of these system' defined backup systems and of the primary server which is current at the time. Changes cause a new catalogue to be produced and stored.

Internally, the catalogue is stored in record format for supply with an optimised standard of performance (few central accesses).

FIG. 4 is a schematic view of the process of supplying the address catalogue. When a document request is made, the application takes the logic address, has the front-end server convert it into a real address, and makes a direct connection to the external archiving system. Rather than accessing the front-end server, the application could undertake the conversion itself if the address catalogue were stored internally.

When a new archive system is introduced or the address of an archive system is changed, a new address catalogue is produced. The address catalogue is stored in the central archive system and supplied to the external central archive interface and stored there. In the event of changes to the address catalogue, a new address catalogue is generated, stored in the central archive system and supplied to the external archive system interfaces. The address catalogue can also be loaded directly into the user system on which the application is stored.

The address catalogue is supplied on a time-stamp basis, i.e., the time stamp is compared with the date of generation. If the date of generation is more recent, the catalogue is supplied. The decentralized storage of the address catalogue prevents multiple accesses to the central archive system. When there are changes, the address catalogue is replaced in toto. This prevents inconsistencies and does away with the need for a log to be kept of the individual changes.

In a further embodiment of the present invention, the embodiments shown in FIGS. 3 and 4 can be combined.

When this is the case, the real address plus x backup addresses (when defined) and the address catalogue are supplied by the central archive system to the external central archive interface. When a document is selected from a list of search results, it is the real server address which is used to make the connection to the external archiving system. If the connection cannot be made, either the correct real address or the address of a backup server is asked for from the address catalogue via the front-end server. The document which is wanted is now requested without a diversion through the central archive.

It is to be understood that the embodiments and variations shown and described herein are merely illustrative of the principles of this invention and that various modifications may be implemented by those skilled in the art without departing from the scope and spirit of the invention.

What is claimed is:

1. A method for archiving and supplying documents using a central archive system, the documents being stored on two or more heterogeneous external archiving systems, each as document being represented on the central archive system by index information and being addressable by means of real address information, and said two or more heterogeneous external archiving systems being connected to the central archive system, said method comprising steps of:

providing for each set of index information for a document being archived on the central archive system a logic address relating to at least one of the heterogeneous external archiving systems;

converting of the logic address to the real address when a document which has been selected is requested; and supplying the selected document via the communications connection between at least one of the heterogeneous external archiving systems and the user system without the assistance of the central archive system.

2. The method according to claim 1, wherein the logic addresses are managed in the central archive system as 1–N relations.

3. The method according to claim 2, wherein a plurality of real addresses (backup servers) are assigned to a logic address, with one of these real addresses being marked out as CURRENT (as the primary server).

4. The method according to claim 1, wherein said converting step further comprises by the following steps:

transmitting a search request to the central archive system;

generating a list of search results by the central archive system containing index information on the documents found and the logic address of at least one of the heterogeneous external archiving systems;

transferring the list of search results to the user system; and converting in the central archive system the logic address to the real address when the selected document is requested.

5. The method according to claim 1, wherein the communications connection between the user system and central archive system is made via an external central archive interface.

6. The method according to claim 5, wherein the external central archive interface is a front-end server.

7. The method according to claim 1, wherein the address information for at least one of the heterogeneous external archiving systems which are logged on to the central archive system is combined into an address catalogue and the address catalogue is stored in the central archive system.

8. The method according to claim 7, wherein the address catalogue is supplied automatically to the front-end server by the central archive system.

9. The method according to claim 8, wherein a new address catalogue is automatically supplied to the front-end server or the user system when there are any changes to the address catalogue in the central archive.

10. The method according to claim 9, wherein the address catalogue contains a time stamp and when a connection is made between the front-end server and the central archive system the time stamp is used for the purpose of correcting the address catalogue.

11. The method according to claim 1, wherein the conversion from logic to real address takes place in the central archive system.

12. The method according to claim 9, wherein the conversion from logic to real address takes place on the front-end server.

13. The method according to claim 9, wherein the address catalogue on the central archive system can be supplied to the user system via the front-end server.

14. The method according to claim 4, wherein a conversion from logic to real address takes place as soon as the list of search results is generated.

15. The method according to claim 14, wherein said conversion further comprises the steps of:

requesting a document by reference to the list of search results;

using the real address to make the connection to at least one of the heterogeneous external archiving systems;

replacing the existing real address with the real address stored in the address catalogue if the former proves invalid or unusable; and making a connection using the replacement real address.

16. The method according to claim 15, wherein said replacing and making steps take place at the time of running on the front-end server.

17. A central archive system for archiving and supplying documents, comprising:

a memory that stores computer-readable code; and a processor operatively coupled to said memory, said processor configured to implement said computer-readable code, said computer-readable code configured to:

provide for each set of index information for a document being archived on the central archive system, a logic address relating to at least one of the heterogeneous external archiving systems;

convert the logic address to the real address when a document which has been selected is requested; and supply the selected document via the communications connection between at least one of the heterogeneous external archiving systems and the user system without the assistance of the central archive system.

18. An article of manufacture for archiving and supplying documents using a central archive system, the documents being stored on two or more heterogeneous external archiving systems, each document being represented on the central archive system by index information and being addressable by means of real address information, and said two or more heterogeneous external archiving systems being connected to the central archive system, said article of manufacture comprising:

a computer readable medium having computer readable code means embodied thereon, said computer readable program code means comprising:

a step to provide for each set of index information for a document being archived on the central archive system, a logic address relating to at least one of the heterogeneous external archiving systems;

a step to convert the logic address to the real address when a document which has been selected is requested; and a step to supply the selected document via the communications connection between at least one of the heterogeneous external archiving systems and the user system without the assistance of the central archive system.

* * * * *